Figure 1:
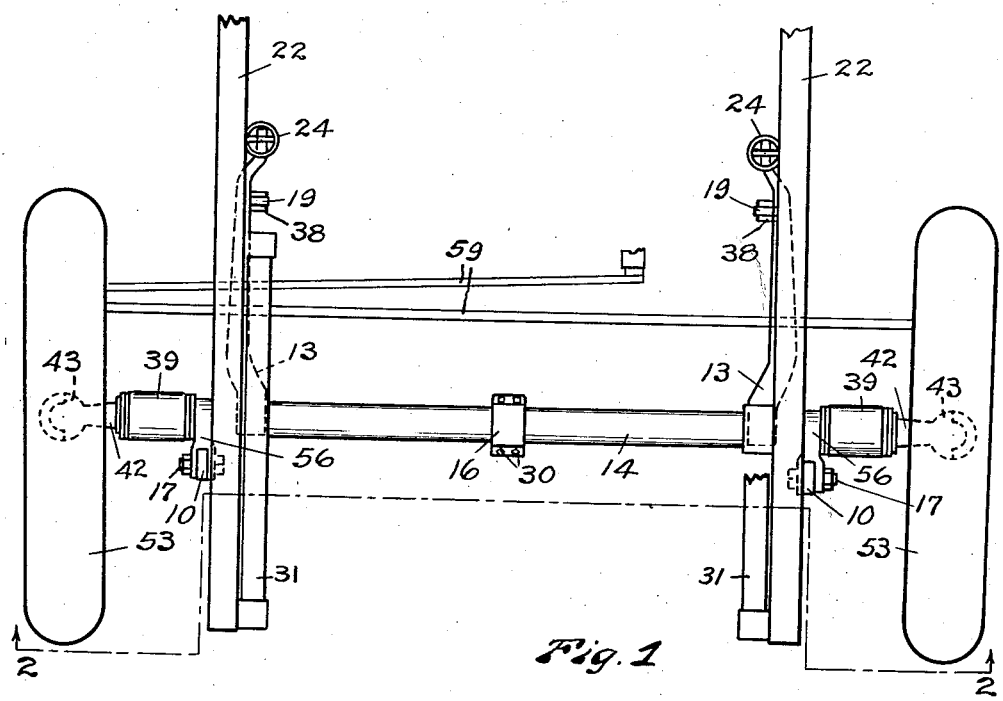

April 17, 1945.　　　　A. KOST　　　　2,373,834
MOTOR VEHICLE STEERING STABILIZER
Filed July 22, 1941　　　　3 Sheets-Sheet 1

INVENTOR
Alwin Kost
BY
Fred C. Matheny
ATTORNEY

April 17, 1945. A. KOST 2,373,834
MOTOR VEHICLE STEERING STABILIZER
Filed July 22, 1941 3 Sheets-Sheet 2

INVENTOR
Alwin Kost
BY
Fred C. Matheny
ATTORNEY

April 17, 1945.  A. KOST  2,373,834

MOTOR VEHICLE STEERING STABILIZER

Filed July 22, 1941   3 Sheets-Sheet 3

INVENTOR
Alwin Kost
BY
Fred C. Matheny
ATTORNEY

Patented Apr. 17, 1945

2,373,834

UNITED STATES PATENT OFFICE 2,373,834

MOTOR VEHICLE STEERING STABILIZER

Alwin Kost, Portland, Oreg.

Application July 22, 1941, Serial No. 403,493

10 Claims. (Cl. 280—87)

This invention relates to a motor vehicle steering stabilizer or wheel mounting means and an object of this invention is to provide a wheel mounting means which will impart a tilting to the wheels of a vehicle when the vehicle is being steered around a curve, said means being automatic and being governed by the weight and speed of the vehicle and being adapted to impart to the wheels of the vehicle a caster which is proportional to the weight and speed of the vehicle and to the degree of curvature of the turn being made.

In my co-pending application Serial Number 297,447, filed October 2, 1939, now Patent No. 2,285,445, issued June 9, 1942, I disclose wheel banking means which is operable whenever the vehicle wheels are angularly moved for steering purposes irrespective of the speed of the vehicle or tilting of the vehicle body. My present invention is an improvement over the device disclosed in my said prior application in that my present wheel banking means is controlled by the tilting of the vehicle body and is therefore responsive to the speed of the vehicle and sharpness of the turn being made.

Another object of the invention is to provide a wheel mounting embodying means for controlling the angular position or tilt of a motor vehicle wheel in such a manner as to best withstand side thrust, especially in the turning of the vehicle.

When a moving vehicle is being turned on a roadway a portion of the momentum of said vehicle is exerted as a transverse thrust on the wheels of the vehicle. This sometimes results in damaged or broken wheels and may be the cause of accidents. Also it causes skidding and excessive tire wear and makes necessary slower speeds on curves. It is an object of this invention to provide a wheel mounting means governed by the vehicle speed and acuteness of the turn being made by which the wheels of a vehicle will automatically be angularly moved into banked position best calculated to resist strains and thrusts due to turning of the vehicle and by which maximum stability on curves is obtained thus minimizing lurching, swaying and skidding and providing greater safety and greater riding comfort.

It is a further object of this invention to provide wheel mounting means which will make possible higher speeds on curves and at the same time provide increased safety, a thing especially desirable in the operation of certain fire, police and military vehicles.

Other objects are to provide wheel mounting means which will reduce accidents, increase the useful life of wheels, axles, motors and other vehicle parts, provide better and easier steering, give better road adherence and thus reduce the danger of skidding and make possible faster speeds on curves with greater safety.

Other objects will be apparent from the following description and accompanying drawings, in which—

Figure 2:
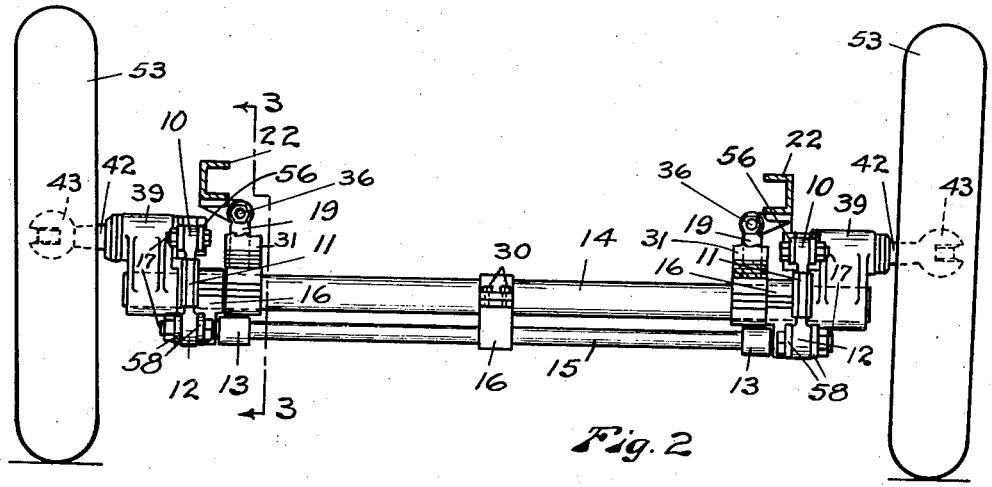
Figure 8:
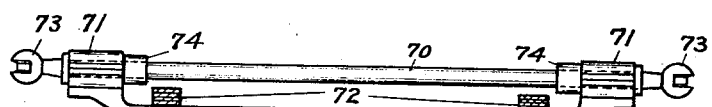
Figure 3:
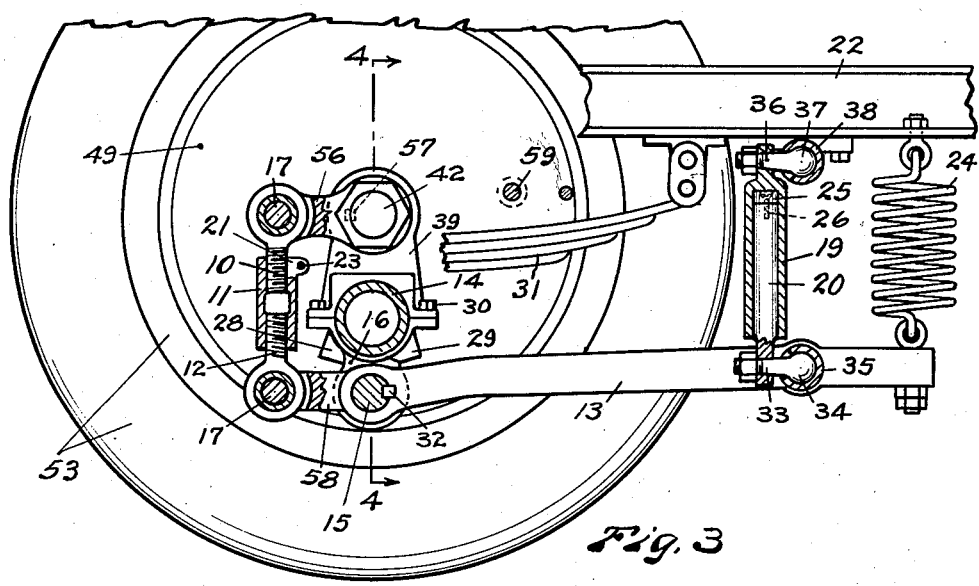
Figures 4, 5:
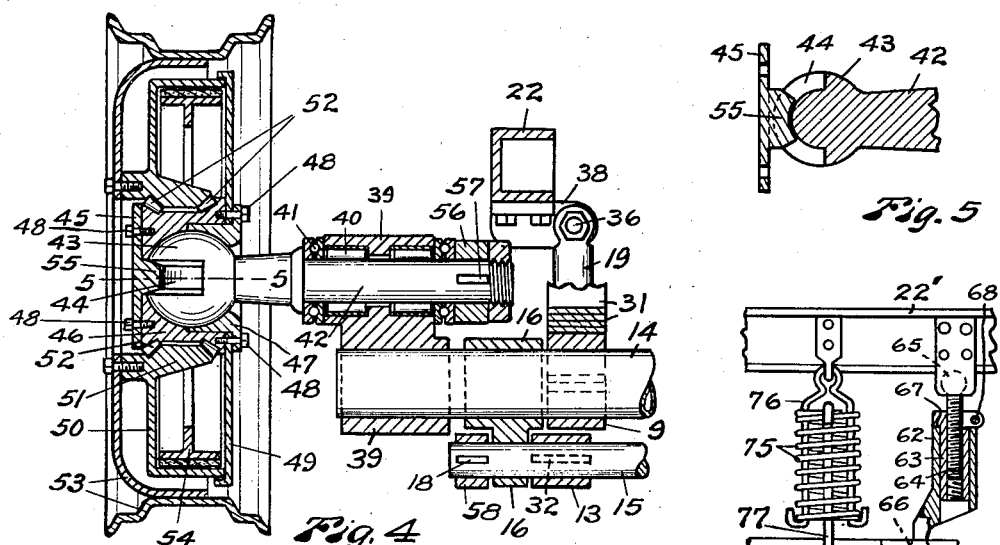
Figures 6, 7:
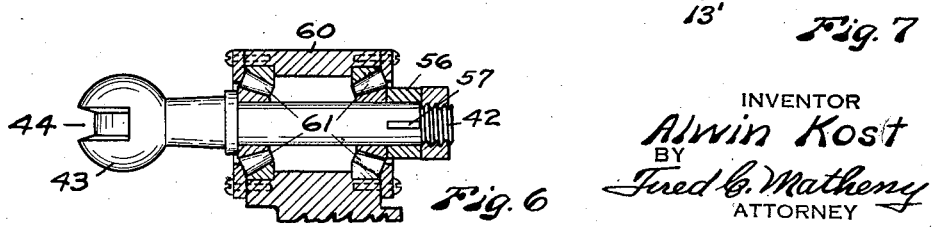
Figure 9:
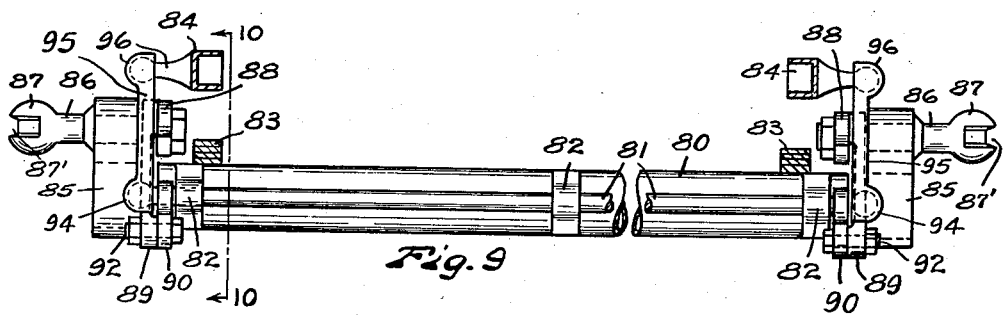
Figure 10:
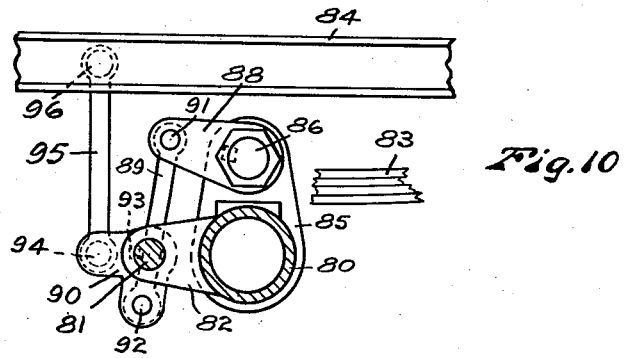
Figure 11:
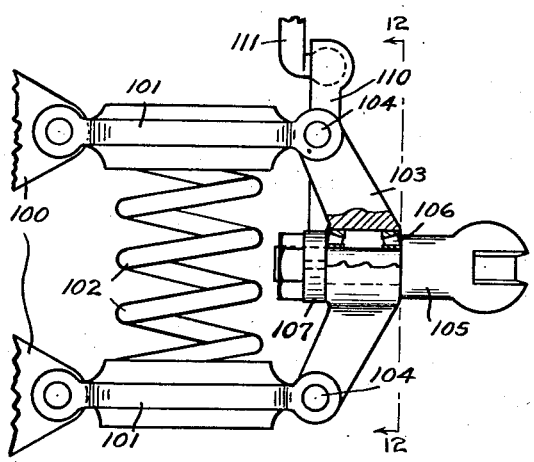
Figure 12:
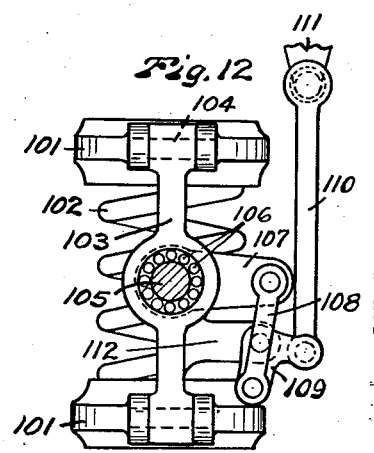

Figure 1 is a fragmentary plan view of a front axle assembly constructed in accordance with my invention; Fig. 2 is a view partly in elevation and partly in section taken substantially on broken line 2—2 of Fig. 4; Fig. 3 is a fragmentary sectional view taken substantially on broken line 3—3 of Fig. 2, and on a larger scale than Fig. 2; Fig. 4 is a fragmentary sectional view with parts in elevation taken substantially on broken line 4—4 of Fig. 3; Fig. 5 is a fragmentary sectional view taken substantially on broken line 5—5 of Fig. 4, parts being omitted; Fig. 6 is a detached sectional view of a modified bearing; Fig. 7 is a detached view partly in section and partly in elevation of modified means for connecting a lever with a frame; Fig. 8 is a detached view of axle means of modified form; Fig. 9 is a detached fragmentary plan view of another modified form of my axle; Fig. 10 is a fragmentary sectional view taken substantially on broken line 10—10 of Fig. 9; Fig. 11 is a fragmentary view partly in section and partly in elevation of another modified form of the invention, and Fig. 12 is a view partly in section and partly in elevation on broken line 12—12 of Fig. 11.

In the drawings 14 is a main front axle and 15 a control shaft adjacent to and immediately below the front axle 14. A plurality of bearing brackets 16 are rigidly secured to the main axle member 14 and rotatably support the control shaft 15. Preferably the bearing brackets 16 are clamped on the main axle member 14 by cap screws 30 or are rigidly welded thereto.

A motor vehicle frame 22 is mounted on the main axle member 14 by any suitable spring suspension means 31. Fragments only of the frame 22 and spring suspension means 31 are shown and it will be understood that these parts may be of any ordinary form of construction.

As the mechanism at the respective end portions of the axle 14 and control shaft 15 is of substantially duplicate construction the following description will apply to the parts at either end thereof.

Two control levers 17 are secured by keys 32 or other securing means to the control shaft 15 and extend rearwardly therefrom underneath the adjacent frame member 22. The rear end portion of each control lever 13 is connected by relatively telescopic link members 19 and 20 with the adjacent frame member 22.

Preferably the lower end portion of the link member 20 is connected with the lever 13 by securing it to a pin 33 having a ball shaped head 34 that is mounted in a socket member 35 which is rigidly secured to the lever 13.

In a similar way the upper end portion of each link member 19 is connected with the adjacent frame member 22 by securing it to a pin member 36 which has a ball shaped head 37 that is mounted in a socket 38. Each socket 38 is rigidly secured to the adjacent frame member 22.

The ball joints thus provided at the end portions of the link members 19 and 20 allow for a free transverse rocking movement of the frame 22 relative to the lever 13 and also allow the lever 13 to change its angular position relative to the frame as the frame moves toward and away from the axle member 14.

The inner telescopic link member 20 preferably has a fiber disc 25 secured thereto by a screw 26. The fiber disc 25 serves as a cushion member between the links 19 and 20 and also provides means by which the effective length of the two links 19 and 20 may be varied by disassembling the links 19 and 20 and substituting fiber discs of different thickness.

The two relatively telescopic link members 19 and 20 arranged as above described provide a connection by which either one of the levers 13 will be moved downwardly by downward movement of the adjacent frame member and at the same time are extensible so as to leave each link member 13 and the adjacent frame member 22 free to move away from each other.

Preferably a tension spring 24 is provided between each link 13 and the adjacent frame member 22 to yieldingly urge these two parts toward each other. This helps to hold the links 19 and 20 in a fully telescoped position when the vehicle wheels are positioned for straight ahead driving. The other forces reacting on link 13 also tend to hold the link members 19 and 20 fully telescoped when the front vehicle wheels are positioned for straight ahead driving.

The respective end portions of the main axle 14 are provided with rigidly connected bearing brackets 39 that extend upwardly from the main axle 14 and each support roller bearings 40 and ball bearings 41 wherein a short axle 42 is journaled. The bearings 40 and 41 are provided to withstand both radial thrust and end thrust.

Each short axle 42 has an enlarged portion 43, preferably of spherical shape provided on the outer end thereof and each enlarged portion 43 is provided with a circumferential groove 44 which preferably extends slightly more than half way around the enlarged portion 43. If desired the enlarged portions 43 may be separable from the axles 42.

Preferably the grooves 44 will be slightly inclined downwardly from rear to front, as respects the horizontal, i. e., the front end portions of these grooves will be slightly lower than the rear end portions thereof, when the frame 22 is level. This arrangement of the grooves 44 will impart to the wheels the proper caster when the steering means 59 is adjusted to give to said wheels the correct camber.

The axle parts 42—43 and 44 and the wheel that is mounted thereon are similar to those disclosed in my co-pending application Serial No. 297,447, now Patent No. 2,285,445 hereinbefore identified.

The hub portion of the wheel comprises three non-rotatable members 45, 46 and 47 fitted over the enlarged axle portion 43 and secured together by cap screws 48. A non-rotatable disc 49 is fixedly secured to the parts 45, 46 and 47. The part 45 has a tooth or spline 55 thereon that fits within the groove 44 in the enlarged axle part 43.

A brake drum 50 has a hub portion 51 that is journaled by roller bearings 52 on the fixed part 46. A wheel 53 is secured to the brake drum 50 and hub 51 and suitable brake means 54 is provided within the drum 50.

The groove 44 and tooth 55 are normally positioned in a plane slightly inclined downwardly from rear to front when the vehicle frame is level. The wheel pivots for steering movement on the ball member 43. When the wheels are positioned for straight ahead driving any turning movement imparted to the axle members 14 by up and down movement of the frame 22 will not substantially affect the caster of the wheels or tend to tilt them in either direction. Thus ordinary frame vibrations will not affect straight ahead driving. However, if the front wheels are angularly positioned for turning the vehicle, as for steering around a curve, and at the same time the axle members 42 are rotatively moved so that the grooves 44 are inclined relative to the horizontal then the wheels will be inclined or tilted or banked so as to increase the stability of the vehicle in turning.

Angular movement of control shaft 15, which is produced by pivotal movement of the levers 13, is communicated to the axles 42 by connecting means as follows: Each short axle member 42 has a lever 56 fixedly secured thereto as by a key 57. Each lever 56 is connected by an adjustable, turnbuckle type link member formed of parts 10, 11 and 12, with another lever 58. Bolts 17 pivotally connect the turnbuckle type link members 10 and 12 with the levers 56 and 58. The levers 58 are rigidly connected, as by keys 18, Fig. 4, with the shaft 15.

Preferably the sleeves 11 on the turnbuckle members have spaced apart lugs 21 adjacent one end and are split between these lugs and each have a bolt or screw extending between these lugs adaptd to be tightened to clamp the sleeve 11 in any position into which it is adjusted. The turnbuckle members 10 and 12 are provided, one with a right hand thread and the other with a left hand thread and the sleeve 11 is correspondingly threaded so that turning of the sleeve 11 will vary the length of the link formed by the parts 10, 11, 12 and provide the necessary adjustment for proper caster of the wheels.

Stop members 28 are rigidly connected with the non-rotatable axle 14 and positioned for engagement with each lever 58 to limit the amount of rotary movement that can be imparted to the control shaft 15 by application of the brakes when the vehicle is being moved backwardly.

Other stop members 29 are rigidly connected with the non-rotatable axle 14 and positioned for engagement with each lever 13 to serve as emergency means and limit movement of the control shaft 15 in the event of damage to a lever 13 or to the link means by which a lever 13 is connected with the frame 22.

59 indicates steering means of any satisfactory type connected with the front wheels 53 of the vehicle.

If the brakes are applied while the vehicle is traveling forwardly the forward brake torque will exert a force tending to move the lever arms 13 upwardly and will act through link members 19—20 as an upward pressure against frame members 22. At the same time the frame 22 will tend to move downwardly due to inertia. These two forces tend to offset each other and minimize the tendency of the car body to lurch forward when the brakes are applied.

The brake mechanism is centered as respects the plane of the front vehicle wheel and as respects the ball 43. If this brake is applied on either a left or a right turn then the forces reacting to the right side of the frame on a left turn and to the left side of the frame on a right turn will restrain the car from excess outward motion and greatly stabilize it.

In the operation of this device when the wheels 53 are positioned for straight ahead driving up and down movement of the frame 22 relative to the axle will angularly move the short axles 42 and this will change the angular position of the grooves 44, but such movement will not affect the incline of the wheels 53 or cause any banking of said wheels. If the front wheels are angularly moved on the balls 43 to steer the vehicle in a curved path then the teeth or spline 55 will be caused to move in the grooves 44 and, if said grooves 44 are inclined relative to the horizontal at the time the front wheels 53 are angularly moved, then the wheels 53 will be tilted or banked.

When a moving vehicle is steered into a turn the force of inertia tends to keep the vehicle body moving in a straight line and this force varies directly with the speed and directly with the angle through which the vehicle is being turned. This force, acting on the frame 22, causes the frame 22 to move downwardly toward the axle member 14 at the side of the vehicle toward the outside of the curve and upwardly away from the axle member 14 at the side of the vehicle toward the inside of the curve, i. e., in a right turn the left side of the vehicle moves downwardly and in a left turn the right side of the vehicle moves downwardly.

Downward movement of one side of the vehicle angularly moves the lever 13 on that side of the vehicle downwardly. This angularly moves the control shaft 15 and the short axles 42 and changes the inclination of the grooves 44 of both of the ball members 43 thereby banking the front wheels on both sides of the vehicle in the proper direction to lend stability to the vehicle in making the turn.

The amount of wheel banking thus provided is proportional to the speed of the vehicle and the sharpness of the turn and in this way the device operates automatically to provide the proper banking of the wheels for all speed and for different curves.

When the lever 13 at one side of the vehicle is moved downwardly the lever 13 at the opposite side will also be moved downwardly, the link means 19—20 allowing either link member 13 and the adjacent frame member to be moved away from each other and the spring 24 elongating under these conditions.

Downward movement of either lever 13 always angularly moves both short axles 42 the same amount.

When the vehicle after making a turn is being straightened out onto a straight course the frame thereof will move back toward a level position, and the springs 24 will exert a lift on the levers 13 and bring them back to a normal position simultaneously with the straightening of the wheels.

When the front wheels have been banked in making a turn they will tend to resume a straight and normal position as soon as the body of the vehicle begins to move back toward the horizontal and if the steering wheel is released as the turn is completed the wheels will come back to a substantially straight ahead position. The greater the banking of the wheels in a turn the greater will be their tendency to return to the normal at the end of the turn.

As the automatic wheel banking mechanism is independent of the steering mechanism no additional strain is placed on the steering mechanism and the steering of the vehicle is made easier especially at high speeds on sharp curves as the weight of the car body acts indirectly instead of directly. In motor vehicles now in common use the weight of the car acts against the wheels directly to force them outwardly away from the road. In a vehicle equipped with my automatic wheel banking means the weight of the vehicle body acts indirectly and the pressure utilized is down and toward the turn taken. This pressure tends to change the direction of travel of the vehicle and therefore tends to neutralize the outward pressure, the result being that squealing of the tires on curves is prevented and wear commonly caused by slippage of the tires on the road greatly reduced.

Fig. 6 shows a modified type of roller bearing to be used in place of the bearings 40—41 of Fig. 4. In the structure illustrated in said Fig. 6 the short axle 42 is supported in roller bearings 61 of the combined radial and end thrust type. The bearings 61 are supported in a housing 60 similar to bearing bracket 39.

Fig. 7 illustrates means for using a compression spring 75 in place of the tension spring 24 of Figs. 1 and 3. The spring 75 is connected by two forked link members 76 and 77 with a frame 22' and lever 13' respectively which correspond to frame 22 and lever 13 of Figs. 1 to 5.

Also in Fig. 7 I show an adjustable link member for connecting the frame member 22' and lever 13'. This adjustable link member comprises two relatively telescopic members 62 and 63 and a bolt member 64 threaded into the member 63. The bolt member 64 is connected by a ball joint 65 with the frame 22'. Another ball joint 66 connects the lower end portion of member 62 with the lever 13'. A shoulder 67 on the member 63 is adapted to be engaged by the upper end portion of the member 62 to limit the telescopic movement of the two members 62 and 63 in one direction. Adjustment of the bolt member 64 in the member 63 varies the length of the link member formed by parts 62—63—64. The upper end portion of member 63 is split on one side from the top downwardly and a transverse screw 68 is provided at the location of this split to lock the members 63 and 64 together.

Fig. 8 shows a modified form of front axle in which 69 is a main load-supporting member and 70 is a control axle that is continuous from one side of the frame to the other and is supported in bearings 71 that are connected with axle 69. Springs 72 carried by axle 69 support a vehicle body. Ball 73 on the respective ends of the control axle 70 are adapted to receive and support wheels, not shown, as previously described. Levers 74, corresponding to previously described levers 13 are secured to control axle 70 to rotatively position control axle 70 and balls 73 and thus control the banking of the wheels. The axle means of Fig. 8 thus combines the control rod 15 and short axles 42 of Figs. 1 to 5 in one single integral piece and provides a more simple and inexpensive construction than that of Figs. 1 to 5.

Figs. 9 and 10 show, fragmentarily, another modified form of the invention in which 80 is a non-rotatable main load-supporting axle and 81 a control axle. Control axle 81 is journaled for oscillation in bearing brackets 82 that are rigid with the load-supporting axle 80. Springs 83 rest on the load-supporting axle 80 and support a vehicle frame 84. Brackets 85 are secured to the end portions of the load-supporting axle 80 and short axles 86 are journaled in the brackets 85. Balls 87 having slots 87' are rigid with short axles 86 and function like balls 43 and slots 44 on axles 42 of Figs. 1 to 5.

Rotary movement of each short axle 86 is controlled by a lever arm 88 connected by a link 89 with the downwardly extending arm of a bell crank 90. Two pivots 91 and 92, which may be ball joints, connect the end portions of link member 89 with lever arm 88 and bell crank 90. Each bell crank member 90 is non-rotatively connected with the control axle 81 by means of a key 93, shown dotted in Fig. 10. The horizontal arm of each bell crank 90 is connected by a ball joint 94 with the lower end portion of a link 95. The upper end portion of the link 95 is connected by a ball joint 96 with the frame 84.

In the operation of the steering stabilizer means shown in Figs. 9 and 10, when the body of the car whereon said steering stabilizer means is used is subjected to the stresses it will be subjected to in steering the car in a curved path the frame member 84 and link 95 toward the inside of the curve will be moved downwardly and the corresponding frame member 84 and link 95 toward the outside of the curve will be moved upwardly. This will angularly move the bell cranks 90 and rotatively move the short shafts 86, so as to change the inclination of the grooves 87' in the balls 87 and provide the proper banking of the wheels.

It is to be noted that the arm of each bell crank 90 with which the link 89 is connected extends downwardly below the control shaft 81 so that, for the normal position of the link 89 and bell crank 90, shown in Fig. 10, the pivots 92 and 91 and the center of the shaft 81 will be substantially in line. When the bell cranks 90 are moved in either direction from this normal position the lever 88 will be always angularly moved upwardly and this will angularly move the balls 86 so as to raise the forward portions of the slots 87' in these balls and lower the rearward portions of said slots. The two ball members 87 will be angularly moved equal amounts in the same direction irrespective of whether the vehicle frame 84 and axles 80—81 are relatively moved closer together or farther apart. This inclination of slots 87' will provide the correct banking of the wheels when the vehicle is steered around a curve.

In this device of Figs. 9 and 10 it is possible to dispense with the control axle 81 and mount the bell cranks 90 on the brackets 82 by means of separate and independent pivots. When this is done the action of the device will be similar to the action obtained by using the control axle 81 with both bell cranks rigidly connected therewith in the manner hereinbefore described because when one side of the vehicle frame moves downwardly in steering the vehicle around a curve the other side of the vehicle frame will move upwardly a substantially equal amount and the angular movement imparted to the ball members 87 at the two sides of the frame will be near enough equal for satisfactory operation.

Figs. 11 and 12 show one unit of an adaptation of the structure of Figs. 9 and 10 for use on vehicles provided with so called "knee action" or individual wheel suspension.

In Figs. 11 and 12, I show two load supporting axle parts 100 connected with members 101 between which a spring 102 is provided. These parts indicate, in a general way, individual wheel suspension means.

A bearing bracket or yoke 103 is connected by pivots 104 with the members 101. A short axle 105 is journaled by bearing means 106 in the bracket 103. The short axle 105 is similar to the axles 86 and is connected by lever arm 107 link 108 bell crank 109 and link 110 with a motor vehicle frame 111. The bell crank 109 is fulcrumed on a bracket 112 that is rigid with the yoke 103. The pivotal connections of the various parts with the end portions of the links 108 and 110 are preferably ball joints.

The several links and levers in Figs. 11 and 12 correspond structurally and functionally to those shown in Figs. 9 and 10 and their operation in controlling the banking of the wheels will be clearly understood by referring to the hereinbefore explained operation of the structure of Figs. 9 and 10. The spring member 102 permits some relative movement of the parts 100 and said spring always tends to restore these parts to their normal position. The ball cranks 109, one of which is provided on each side of the vehicle, will always tend to rotatively move the two axles in the same direction irrespective of whether the vehicle member 111 with which they are connected is moved upwardly or downwardly. This provides for simultaneously banking two oppositely positioned wheels in the same direction.

The foregoing description and accompanying drawings clearly disclose a preferred embodiment of my invention but it will be understood that this disclosure is merely illustrative and that changes may be made within the scope and spirit of the following claims.

I claim:

1. A motor vehicle wheel mounting comprising axle means; wheels rotatively mounted thereon for steering and banking movement; tongue and groove means controlling the banking movement of said wheels; and means actuated by the inertia of the vehicle body for adjusting the position of said tongue and groove means and thereby banking the vehicle wheels when the vehicle is in motion and the wheels are angularly moved to turn said vehicle, said last mentioned means being inoperative to bank said wheels when said wheels are positioned for movement of the vehicle in a straight line.

2. A motor vehicle wheel mounting comprising two substantially horizontal outwardly directed axles supported at opposite sides of the motor vehicle for rotative adjustment; wheels rotatively mounted on said axles for steering and banking movement; tongue and groove means operatively disposed between said wheels and said axles adapted to control the banking movement of said wheels; and means adapted to be actuated by the inertia of the vehicle body for rotatively adjusting said axles to thereby vary the inclination of said tongue and groove means and bank said vehicle wheels when the vehicle is in motion and the wheels are angularly moved to turn the vehicle.

3. A motor vehicle wheel mounting comprising an axle member; a portion of larger diameter than said axle member on the outer end thereof; non-rotatable hub means mounted on said portion of larger diameter for steering and banking movement; wheel means rotatively mounted on said hub means; tongue and groove means interconnecting said hub means and said axle member; and means actuated by the inertia of the vehicle body for adjusting the position of said tongue and groove means to thereby provide banking of the vehicle wheels when the vehicle is in motion and the wheels thereof are angularly moved to turn said vehicle.

4. A motor vehicle wheel mounting comprising a non-rotatable axle member mounted for rotary adjustment; a portion of larger diameter than said axle member on the outer end thereof; non-rotatable hub means mounted on said portion of larger diameter for steering and banking movement; wheel means rotatively mounted on said hub means; a groove in the end of said portion of larger diameter; a tongue member on said non-rotatable hub means fitting within said groove adapted to bank said wheel means when said wheel means is pivotally moved to turn the vehicle; and means actuated by the inertia of the vehicle body for adjusting the position of said tongue and groove means and thereby banking the wheel means when the vehicle is in motion and the wheels are angularly moved to turn the vehicle.

5. A motor vehicle wheel mounting comprising an axle member; a ball of larger diameter than said axle member on the outer end portion thereof; means supporting said axle member for rotative adjustment; non-rotatable hub means mounted on said ball member for steering and banking movement; tongue and groove means interconnecting said hub means and said ball; and means governed by swaying movement of the vehicle body for rotatively adjusting said axle member.

6. A motor vehicle wheel mounting comprising axle members; a ball of larger diameter than said axle members on the outer end of each axle member; transverse load-carrying means supporting each axle member for rotative adjustment; a vehicle frame; non-rotatable hub means mounted on each ball member for steering and banking movement; a substantially horizontal groove in the outer portion of each ball member; a tooth on each non-rotatable hub member positioned within the groove in the adjacent ball member; lever means connected with each axle member for rotatively adjusting the same; and other lever means connected with the frame of the vehicle and with the lever means that connects with said axles for rotatively adjusting said axles when the vehicle frame is tilted in the turning of the vehicle to thereby bank the wheels.

7. A motor vehicle wheel mounting comprising axle members; a ball of larger diameter than said axle members on the outer end of each axle member; transverse load-carrying means supporting each axle member for rotative adjustment; a vehicle frame; non-rotatable hub means mounted on each ball member for steering and banking movement; a substantially horizontal groove in the outer portion of each ball member; a tooth on each non-rotatable hub member positioned within the groove in the adjacent ball member; lever means connected with each axle member for rotatively adjusting the same; control lever means fulcrumed on said load carrying means; link means connecting said control lever with the levers on said axle members; and other link means connecting said control lever means with the vehicle frame.

8. A motor vehicle wheel mounting comprising axle members; a ball of larger diameter than said axle members on the outer end of each axle member; transverse load-carrying means supporting each axle member for rotative adjustment; a vehicle frame; non-rotatable hub means mounted on each ball member for steering and banking movement; a substantially horizontal groove in the outer portion of each ball member; a tooth on each non-rotatable hub member positioned within the groove in the adjacent ball member; lever means connected with each axle member for rotatively adjusting the same; control lever means fulcrumed on said load carrying means; link means connecting one end portion of said control lever means with the levers on said axle means; and lost-motion link means connecting the other end portion of said control lever means with the frame; said lost motion link means being operable to angularly move said control lever means in response to downward movement of said frame and providing lost motion when said frame and said control lever are relatively moved apart.

9. A motor vehicle wheel mounting comprising axle members; a ball of larger diameter than said axle members on the outer end of each axle member; transverse load-carrying means supporting each axle member for rotative adjustment; a vehicle frame; non-rotatable hub means mounted on each ball member for steering and banking movement; a substantially horizontal groove in the outer portion of each ball member; a tooth on each non-rotatable hub member positioned within the groove in the adjacent ball member; lever means connected with each axle member for rotatively adjusting the same; a control axle supported for oscillation by said load-carrying means; control lever means fulcrumed on said load carrying means and secured to said control axle adjacent each end thereof and operable to angularly move said control axle; link means connecting the lever on each axle member with said control lever means; and lost-motion link means connecting each control lever means with the adjacent vehicle frame member operable to angularly move said control axle when either side of said vehicle frame is moved downwardly irrespective of the position of the other side of said vehicle frame.

10. A motor vehicle wheel mounting comprising axle members; a ball of larger diameter than said axle members on the outer end of each axle member; transverse load-carrying means supporting each axle member for rotative adjustment; a vehicle frame; non-rotatable hub means mounted on each ball member for steering and banking movement; a substantially horizontal groove in the outer portion of each ball member; a tooth on each non-rotatable hub member positioned within the groove in the adjacent ball member; lever means connected with each axle member for rotatively adjusting the same; bell crank lever means fulcrumed on said load-carrying means and having two lever arms, one of which extends downwardly and the other of which extends in a generally horizontal direction; a link connecting the horizontal arm of said bell crank lever with the vehicle frame and operable to angularly move said bell crank lever as said vehicle frame is moved toward and away from said load carrying means; and another link connecting the downwardly extending arm of said bell crank lever with said lever means on said axle member, the two end pivots of said last named link and the fulcrum of said bell crank lever normally being substantially in line, whereby movement of said vehicle frame either toward or away from said load carrying means will impart an upward movement to said lever on said axle member.

ALWIN KOST.